United States Patent
Yamamoto

(12) 
(10) Patent No.: US 8,463,111 B2
(45) Date of Patent: Jun. 11, 2013

(54) TELEVISION BROADCAST PROGRAM RECORDING SYSTEM

(75) Inventor: Manabu Yamamoto, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 217 days.

(21) Appl. No.: 13/162,045

(22) Filed: Jun. 16, 2011

(65) Prior Publication Data

US 2011/0311203 A1    Dec. 22, 2011

(30) Foreign Application Priority Data

Jun. 18, 2010    (JP) ................................ 2010-139721

(51) Int. Cl.
*H04N 5/92*    (2006.01)
*H04N 5/76*    (2006.01)

(52) U.S. Cl.
USPC ......................................... 386/326; 386/291

(58) Field of Classification Search
None
See application file for complete search history.

(56) References Cited

U.S. PATENT DOCUMENTS

| | | | |
|---|---|---|---|
| 2002/0135698 A1* | 9/2002 | Shinohara | 348/473 |
| 2008/0271077 A1* | 10/2008 | Kim et al. | 725/39 |
| 2009/0316004 A1 | 12/2009 | Kitamori et al. | |

FOREIGN PATENT DOCUMENTS

| | | |
|---|---|---|
| EP | 1 081 565 | 3/2001 |
| JP | 07-077587 | 3/1995 |
| JP | 2001-066384 | 3/2001 |
| JP | 2010-002189 | 1/2010 |

* cited by examiner

*Primary Examiner* — William C Vaughn, Jr.
*Assistant Examiner* — Asher Khan
(74) *Attorney, Agent, or Firm* — Morgan, Lewis & Bockius LLP

(57) ABSTRACT

There is provided a television broadcast program recording system including a television receiver and a recorder. The television receiver obtains a DST data indicating whether or not DST is currently applied, and detects a start and end of a DST application to a current time based on the obtained DST data. When the start or end of the DST application is detected, the television receiver transmits a newest electronic program list to the recorder. The recorder receives the electronic program list, and then compares a broadcast time data of a broadcast program in the memory with that included in the received electronic program list. As a result of this, when they are not identical with each other, the recorder changes the broadcast time data of the above broadcast program stored in the memory to the broadcast time data of the above broadcast program included in the electronic program list.

4 Claims, 3 Drawing Sheets

TELEVISION BROADCAST PROGRAM RECORDING SYSTEM

BACKGROUND OF THE INVENTION

1. Field of the Invention

The present invention relates to a television broadcast program recording system which receives and records a television broadcast program.

2. Description of the Related Art

Conventionally, there is a known television broadcast program recording system (abbreviated as the recording system hereinafter) provided with a television receiver (abbreviated as the receiver hereinafter) and a recording device which operates in cooperation with the receiver. The receiver receives a television broadcast program (abbreviated as the broadcast program hereinafter), displays an image of the broadcast program, and outputs a sound of the broadcast program. The above recording device receives the broadcast program and records the broadcast program. Moreover, the above recording device can perform a processing of timer recording, that is to say, a processing to record a future broadcast program, which is programmed to be recorded in advance, automatically when the programmed program is broadcast.

In some countries including the United States, Daylight Saving Time (abbreviated as the DST hereinafter) system, that is to say, a system of moving a clock forward, for example, by one hour from standard time only during a certain period of time in summer is introduced. In areas where the DST system is introduced, a broadcast time of the broadcast program sometimes changes when the standard time and the DST are switched to each other. Thus, in the above recording system, there is a possibility of failing to record the broadcast program which is programmed to be recorded.

There are known apparatuses which can accurately perform a programmed event regardless of a switching between the standard time and the DST (refer to Japanese Laid-Open Patent Publication Nos. 2001-66384 and 7-77587, for example), and some of those apparatuses detect the switching from a DST data included in broadcast signals and correct times of an internal clock and the programmed process.

To solve the above problem, an application of the configurations of the above apparatuses to the above recording system may be suggested. However, it is difficult to solve the above problem even by such a recording system to which the above configurations are applied. The reason is that the broadcast time of the broadcast program is not always moved forward or backward by a predetermined period of time constantly and such a change of time cannot be known.

There is a known automatic time setting system which singly enables an automatic time setting of an electronic equipment which requires a manual time setting (refer to Japanese Laid-Open Patent Publication No. 2010-2189, for example). However, it is difficult to solve the above problem by this automatic time setting system.

SUMMARY OF THE INVENTION

The present invention is to solve the above problem, and an object of the present invention is to provide a television broadcast program recording system which can reliably record a broadcast program even when a timer recording of the broadcast program is set without regard to DST before an application of the DST to a current time starts (or ends) and then the timer recording is performed after the starting (ending) of the application.

To achieve the above problems, a television broadcast program recording system comprises: a television receiver which receives television broadcast signals (abbreviated as the broadcast signals hereinafter) including data of a television broadcast program (abbreviated as the broadcast program hereinafter), displays an image of the broadcast program, and outputs a sound of the broadcast program; and a recording device which is connected to the television receiver and enables the timer recording of the broadcast program, whose setting is performed by the television receiver, to a memory medium.

The television receiver includes: a DST data acquisition means which obtains a DST data indicating whether or not DST (Daylight Saving Time) is currently applied from the broadcast signals; a DST application detecting means which detects a start and end of a DST application to a current time based on the DST data obtained by the DST data acquisition means; and a transmission means which transmits to the recording device a newest broadcast program data to which the DST is applied when the start of the DST application is detected by the DST application detecting means, and transmits to the recording device a newest broadcast program data to which the DST is not applied when the end of the DST application is detected by the DST application detecting means.

The recording device includes: a receiving means which receives the broadcast program data transmitted from the transmission means; a memory means which stores a broadcast time data of a future broadcast program which is timer-recorded; a broadcast time comparison means which compares a broadcast time data of the broadcast program stored in the memory means with a broadcast time data of the broadcast program included in the broadcast program data received by the receiving means; and a broadcast time data change means which changes the broadcast time data of the broadcast program stored in the memory means to the broadcast time data of the broadcast program which is included in the broadcast program data received by the receiving means when, as a result of comparison by the broadcast time comparison means, the broadcast time data of the broadcast program stored in the memory means is not identical with the broadcast time data of the broadcast program included in the broadcast program data.

According to the above configuration, even when the timer recording of the broadcast program is set without regard to the DST before the application of the DST to the current time starts (or ends) and then the timer recording is performed after the starting (ending) of the application, the recording device can automatically change the broadcast time data of the broadcast program which is timer-recorded to the newest broadcast time data based on the newest broadcast program data after the application of the DST starts (or ends). Consequently, the broadcast program can reliably be recorded.

BRIEF DESCRIPTION OF THE DRAWINGS

The present invention will be described below with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
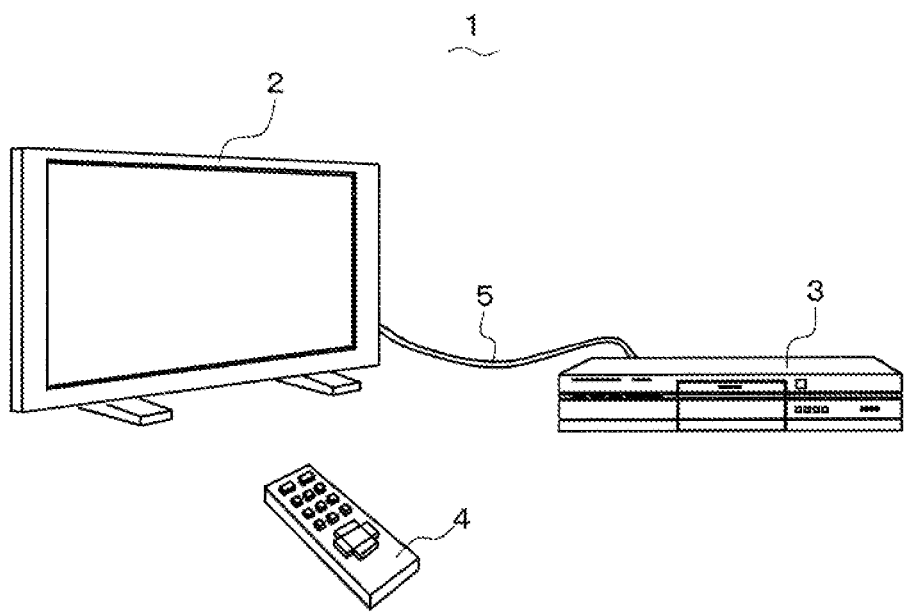
FIG. 1 is a perspective view showing a configuration of a television broadcast program recording system according to a preferred embodiment of the present invention.

A television broadcast program recording system according to a preferred embodiment of the present invention (abbreviated as the recording system hereinafter) is described with reference to the drawings. FIG. 1 shows a configuration of the recording system of the present preferred embodiment. A recording system 1 includes a television receiver (abbreviated as the receiver hereinafter) 2, a recorder 3 (recording device), and a remote controller (abbreviated as the controller hereinafter) 4 to control the receiver 2 remotely. The receiver 2 and the recorder 3, which conform to HDMI-CEC (High Definition Multimedia Interface-Consumer Electronics Control) standard, are connected to each other via a HDMI cable 5 and operate in cooperation with each other by mutually controlling each other.

The receiver 2 receives television broadcast signals (abbreviated as the broadcast signals hereinafter) including data of a television broadcast program (abbreviated as the broadcast program hereinafter), displays an image of the broadcast program, and outputs a sound of the broadcast program. The recorder 3 receives the broadcast signals and enables a timer recording of the broadcast program in a memory medium.

In the recording system 1, two types of settings regarding the timer recording of the recorder 3 can be performed by operating the receiver 2 using the controller 4 or by the receiver 2 automatically.

In one of the above settings, when an arbitrary broadcast program is selected from an electronic program list which is currently displayed on the receiver 2 by operating the controller 4 and the timer recording of the selected broadcast program is programmed, the programmed data is automatically transmitted from the receiver 2 to the recorder 3. Thus, the recorder 3 is set to perform the timer recording in accordance with the programmed data. This setting is complied with so-called "timer programming command" specified in HDMI-CEC standard. According to this setting, the timer recording of the broadcast program does not have to be set on the recorder 3.

In the other of the above settings, a start and end of DST (Daylight Saving Time) application to a current time are detected, and a time data of the timer recording which is already set in the recorder 3 before detecting the start and end of the DST application is updated by the receiver 2. The DST is the same as summer time in Europe.

Figure 2:
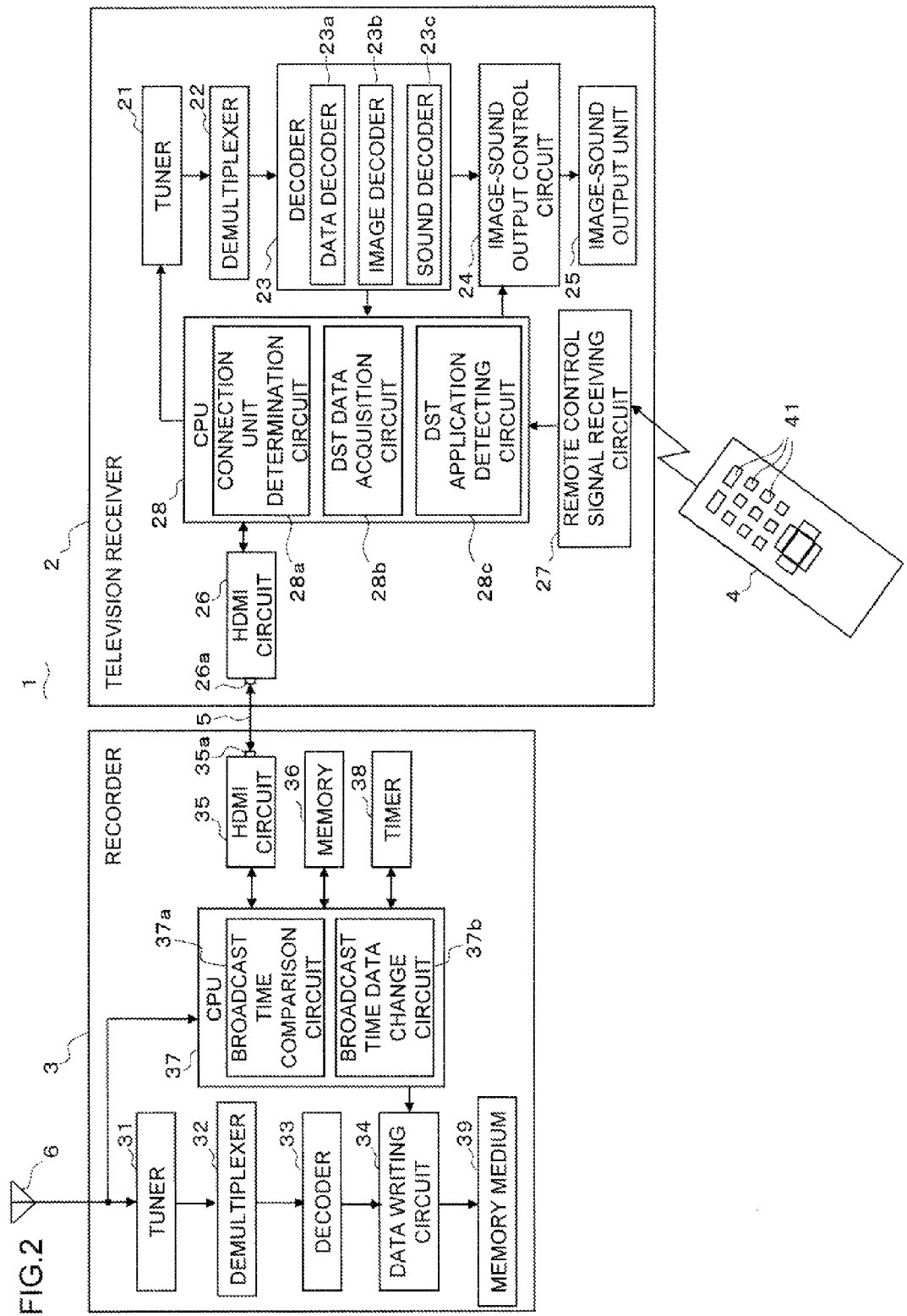
FIG. 2 is an electrical block diagram of the television broadcast program recording system in FIG. 1.

FIG. 2 shows an electrical configuration of the recording system 1. The receiver 2 includes a tuner 21, a demultiplexer 22, a decoder 23, an image-sound output control circuit (abbreviated as the control circuit hereinafter) 24, an image-sound output unit 25, a HDMI circuit 26, a remote control signal receiving circuit (abbreviated as the receiving circuit hereafter) 27, and a CPU 28.

The tuner 21 receives the broadcast signals via an antenna 6 and tunes a received frequency to a frequency which corresponds to a physical channel selected by operating the controller 4, and thereby selects the broadcast signals of the channel.

The demultiplexer 22 demodulates the broadcast signals of the channel selected by the tuner 21, performs an error correcting process on the demodulated broadcast signals, and separates TS packets of data signals, image signals, and sound signals, respectively, from the broadcast signals on which the error correcting process is performed. Data signals of the electronic program list (broadcast program data signals) are superimposed on the above data signals.

The decoder 23 has a data decoder 23a, an image decoder 23b, and a sound decoder 23c which decode the TS packets of the data signals, the image signals, and the sound signals separated by the demultiplexer 22, respectively.

The control circuit 24 reproduces the data signals decoded by the data decoder 23a, or the image signals decoded by the image decoder 23b so as to make the image-sound output unit 25 display an image of the electronic program list or the broadcast program, for example. Moreover, the control circuit 24 reproduces the sound signals decoded by the sound decoder 23c and makes the image-sound output unit 25 output a sound. The image-sound output unit 25 includes a display to display the image and a speaker to output the sound.

The HDMI circuit 26, which makes up the transmission means, is an interface circuit which conforms to HDMI-CEC standard and transfers various data to and from the recorder 3 via the HDMI cable 5. The interface circuit has a communication terminal 26a (transmission terminal) to which a connection terminal of the HDMI cable 5 is connected. The communication terminal 26a is a connector whose direct connection object is one end of the HDMI cable 5. Thus, as long as an electronic device which is connected to a connector in other end of the HDMI cable 5 conforms to HDMI-CEC standard, the communication terminal 26a is connected to the electronic device via the HDMI cable 5 so that the receiver 2 can communicate with the electronic device. Accordingly, the communication terminal 26a is a common terminal which can be connected to any of the recorder 3 or the other electronic device excluding the recorder 3.

The receiving circuit 27 receives remote control signals from the controller 4 and transmits the remote control signals to the CPU 28. As this wireless system, any of an infrared wireless, a specified low power wireless, or the like can be applied.

The CPU 28 performs a selection control of the tuner 21 and an image-audio output control of the control circuit 24 based on the remote control signals from the controller 4. Moreover, the CPU 28 performs a data transmission control of the HDMI circuit 26 in accordance with the above remote control signals or the data signals decoded by the data decoder 23a. The data transmission control includes a transmission of a programmed recording data, which is set by a user based on the electronic program list, to the recorder 3 in accordance with the above timer programming command. The above programmed recording data includes data of a name, a channel, a category, a cast, a program start time, a program end time, and so on of a future broadcast program to be timer-recorded.

The CPU 28 has a connection unit determination circuit 28a (a connection unit determination means) which determines whether or not a unit which is connected to the communication terminal 26a is the recorder 3 and a DST data acquisition circuit 28b (a DST data acquisition means) which obtains the DST data in the data signals decoded by the data decoder 23a only when the connection unit determination circuit 28a determines that the unit which is connected to the communication terminal 26a is the recorder 3. The DST data is a data which indicates whether or not the DST is currently applied and is also a flag value called DS_STATUS which is included in STT (System Time Table) when the broadcast signals conform to ATSC (Advanced Television Systems Committee) standard. The flag value is 1 during a period when the DST is applied and is 0 during a period when the DST is not applied.

Moreover, the CPU 28 has a DST application detecting circuit 28c (a DST application detecting means) which detects a start and end of the DST application to a current time in accordance with the DST data obtained by the DST data acquisition circuit 28b.

When the start or end of the DST application is detected by the DST application detecting circuit 28c, the CPU 28, which makes up a transmission means, transmits an electronic program list and DST data which are newest at that moment from the HDMI circuit 26 to the recorder 3. The electronic program list is transmitted for a predetermined period of time at regular intervals, for example, from a time the start or end of the DST application is detected. When the DST application to the current time starts, the DST is applied to a start time and end time of a broadcast program (abbreviated as the broadcast time hereinafter) in the electronic program list, and the broadcast time is shown in DST. When the DST application to the current time ends, DST is not applied to the above broadcast time, but the broadcast time is shown in the standard time.

The recorder 3 includes a tuner 31, a demultiplexer 32, a decoder 33, a data writing circuit 34, a HDMI circuit 35, a memory 36, a CPU 37, and a timer 38.

The tuner 31, the demultiplexer 32, and the decoder 33 have configurations equivalent to the tuner 21, the demultiplexer 22, and the decoder 23, respectively.

The data writing circuit 34 is a circuit which writes the data signals, the image signals, and the sound signals decoded by the decoder 33 to a memory medium 39. The memory medium 39 can be a HDD which is mounted on the recorder 3, and it can also be an optical disk such as a DVD which can be inserted into and removed from the recorder 3.

The HDMI circuit 35 (receiving means) has a configuration equivalent to the HDMI circuit 26 and has a communication terminal 35a having the same configuration as the communication terminal 26a. The HDMI circuit 35 receives the programmed recording data, the electronic program list, and the DST data transmitted from the HDMI circuit 26 via the cable 5 and transfers them to the CPU 37.

The programmed recording data and the electronic program list transmitted from the receiver 2 are stored in the memory 36 (memory means) by the CPU 37.

The CPU 37 refers to the programmed recording data stored in the memory 36, selects a channel received by the tuner 31 to a channel which is programmed to be recorded in accordance with the programmed recording data, times the current time using the timer 38, starts recording at a broadcast start time using the data writing circuit 34, and ends recording at a broadcast end time.

The CPU 37 has a broadcast time comparison circuit 37a (broadcast time comparison means) and a broadcast time data change circuit 37b (broadcast time data change means). When receiving the electronic program list from the receiver 2 by the HDMI circuit 35, the broadcast time comparison circuit 37a compares a broadcast time data of a broadcast program programmed to be recorded, which is stored in the memory 36, with a broadcast time data of the above broadcast program included in the received electronic program list. The broadcast time comparison circuit 37a searches for the broadcast program in the electronic program list based on an identical data (for example, a name of program) regardless of the DST application to the current time, among the various data of the broadcast program. When, as a result of comparison by the broadcast time comparison circuit 37a, the broadcast time data of the broadcast program stored in the memory 36 is not identical with the broadcast time data of the above broadcast program included in the above electronic program list, the broadcast time data change circuit 37b changes the former broadcast time data to the latter broadcast time data.

In addition, when receiving the DST data from the receiver 2 by the HDMI circuit 35, the CPU 37 changes a setting of the current time which is timed by the timer 38 based on the DST data. In detail, when detecting the switching from the standard time to the DST (the start of the DST application), the CPU 37 adds a time difference between the standard time and the DST to the current time, and when detecting the switching from the DST to the standard time (the end of the DST application), the CPU 37 subtracts the above time difference from the current time.

The controller 4, which has various keys 41 which can be operated by pressing the keys, transmits the remote control signals for indicating the various controls to the receiver 2 and the recorder 3 separately based on a key operation. The above controls include a selection of channels received by the tuner 21, a setting for the timer recording of the broadcast program, a volume control by the control circuit 24, and so on.

Figure 3:
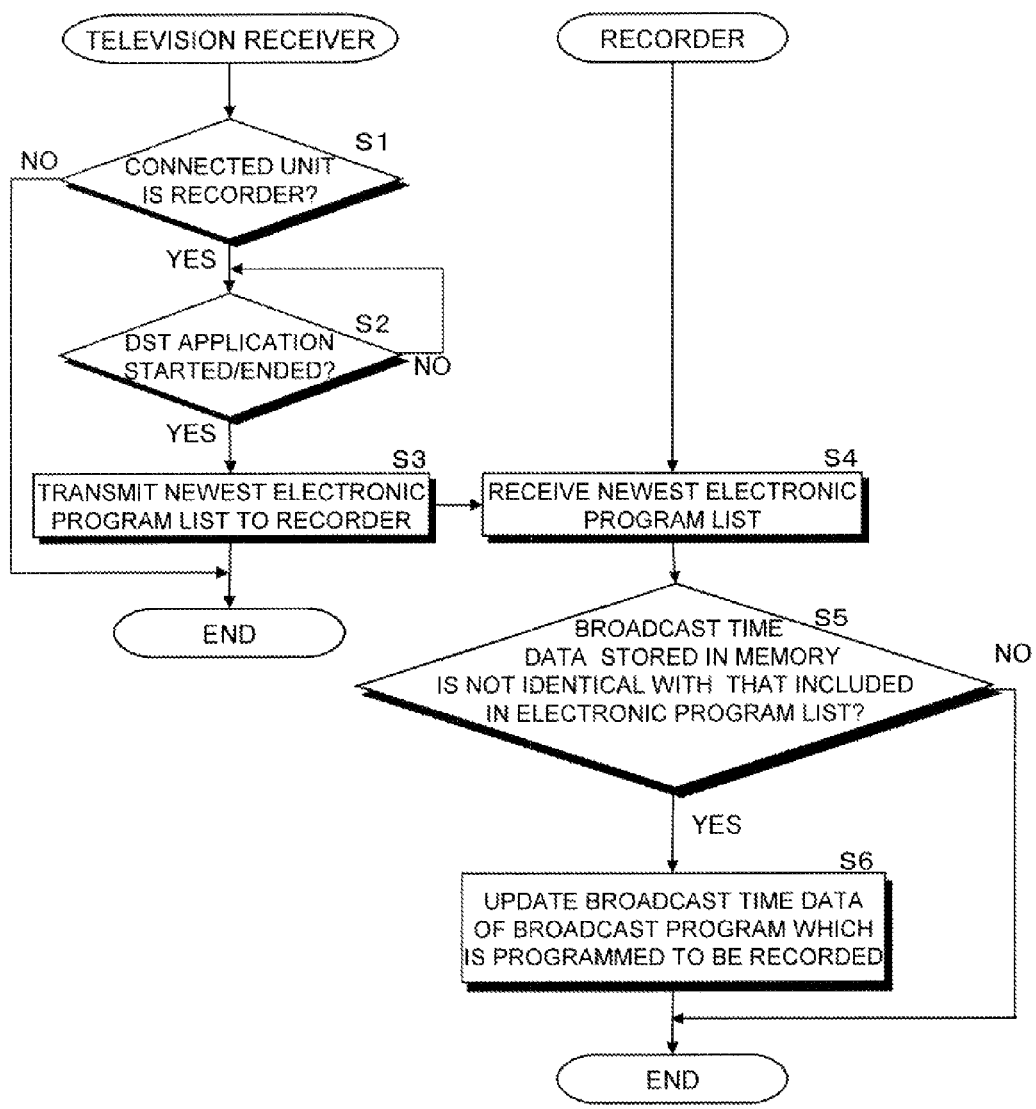
FIG. 3 is a flow chart of a process of changing a programmed recording data in the television broadcast program recording system in FIG. 1.

Next, an operation of changing the programmed recording data in the recording system 1 is described with reference to FIG. 3. FIG. 3 shows a process of the above changing operation. The receiver 2 determines whether or not a unit which is connected to the receiver 2 is the recorder 3. And then, when determining that the unit is the recorder 3 (Yes in S1), the receiver 2 detects the start or end of the DST application to the current time, that is to say, whether or not a state of application is changed. As a result of the determination, when detecting that the state of application is changed (Yes in S2), the receiver 2 transmits a newest electronic program list to the recorder 3 (S3). When determining that the unit is not the recorder 3 in the determination process in S1 (No in S1), the receiver 2 finishes its operation.

The recorder 3 receives the newest electronic program list transmitted from the receiver 2 (S4) and detects whether or not the broadcast time data (, which is stored in the memory 36,) of the broadcast program which is already programmed to be recorded is identical with the broadcast time data of the above broadcast program included in the received electronic program list, and when detecting that they are not identical with each other (Yes in S5), the recorder 3 corrects and updates the broadcast time data of the broadcast program which is already programmed to be recorded to the broadcast time data shown in the newest electronic program list (S6). When the broadcast time data of the broadcast program which is already programmed to be recorded is identical with the broadcast time data of the above broadcast program included in the received electronic program list (No in S5), the recorder 3 finishes its operation.

In the present preferred embodiment, even when the timer recording of the broadcast program is set without regard to the DST before the application of the DST to the current time starts (or ends) and then the timer recording is performed after the starting (ending) of the application, the recorder 3 can automatically change the broadcast time data of the broadcast program which is timer-recorded to the newest broadcast time data based on the newest electronic program list after the application of the DST starts (or ends). Consequently, the broadcast program can reliably be recorded. Moreover, an error in recording can be avoided without any special consciousness of the user.

Furthermore, the receiver 2 determines whether or not the electronic device which is connected to the receiver 2 is the recorder 3 and obtains the DST data only when the electronic device is determined to be the recorder 3. Consequently, when the electronic device which is connected to the receiver 2 is not the recorder 3, the DST data is not obtained and the series of operations using the DST data is not performed. Thus, an electrical power saving can be promoted.

The present invention is not limited to the above configuration of the preferred embodiment, however, various modification are applicable depending on an intended use. For example, the programmed recording data which is stored in the memory 36 can be the data of the broadcast program which is programmed to be recorded by an operating device mounted on the recorder 3 or the controller 4.

What is claimed is:

1. A television broadcast program recording system, comprising:
   a television receiver which receives television broadcast signals (abbreviated as the broadcast signals hereinafter) including data of a television broadcast program (abbreviated as the broadcast program hereinafter), displays an image of the broadcast program, and outputs a sound of the broadcast program; and
   a recording device which is connected to the television receiver and enables the timer recording of the broadcast program, whose setting is performed by the television receiver, to a memory medium, wherein
   the television receiver includes:
   a DST data acquisition means which obtains a DST data indicating whether or not DST (Daylight Saving Time) is currently applied from the broadcast signals;
   a DST application detecting means which detects a start and end of a DST application to a current time based on the DST data obtained by the DST data acquisition means; and
   a transmission means which transmits to the recording device a newest broadcast program data to which the DST is applied when the start of the DST application is detected by the DST application detecting means, and transmits to the recording device a newest broadcast program data to which the DST is not applied when the end of the DST application is detected by the DST application detecting means, and
   the recording device includes:
   a receiving means which receives the broadcast program data transmitted from the transmission means;
   a memory means which stores a broadcast time data of a future broadcast program which is timer-recorded;
   a broadcast time comparison means which compares a broadcast time data of the broadcast program stored in the memory means with a broadcast time data of the broadcast program included in the broadcast program data received by the receiving means; and
   a broadcast time data change means which changes the broadcast time data of the broadcast program stored in the memory means to the broadcast time data of the broadcast program which is included in the broadcast program data received by the receiving means when, as a result of comparison by the broadcast time comparison means, the broadcast time data of the broadcast program stored in the memory means is not identical with the broadcast time data of the broadcast program included in the broadcast program data.

2. The television broadcast program recording system according to claim 1, wherein
   the transmission means has a common transmission terminal which can be connected to any of the recording device or other electronic device excluding the recording device, and a connection unit determination means which determines whether or not a unit which is connected to the transmission terminal is the recording device, and
   the DST data acquisition means obtains the DST data when the connection unit determination means determines that the unit which is connected to the transmission terminal is the recording device.

3. The television broadcast program recording system according to claim 2, wherein
   the transmission means and the receiving means are interfaces which conform to HDMI-CEC (High Definition Multimedia Interface-Consumer Electronics Control) standard and transmit or receive the data via a HDMI cable.

4. The television broadcast program recording system according to claim 1, wherein
   the transmission means and the receiving means are interfaces which conform to HDMI-CEC (High Definition Multimedia Interface-Consumer Electronics Control) standard and transmit or receive the data via a HDMI cable.

* * * * *